(12) United States Patent
Prasad et al.

(10) Patent No.: US 10,019,014 B2
(45) Date of Patent: Jul. 10, 2018

(54) LANE-KEEPING SYSTEM FOR AUTOMATED VEHICLES

(71) Applicant: Delphi Technologies, Inc., Troy, MI (US)

(72) Inventors: Premchand Krishna Prasad, Carmel, IN (US); Michael I. Chia, Cicero, IN (US); Ehsan Samiei, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/154,076

(22) Filed: May 13, 2016

(65) Prior Publication Data

US 2017/0329345 A1 Nov. 16, 2017

(51) Int. Cl.
| | |
|---|---|
| *G05D 1/02* | (2006.01) |
| *B60W 10/20* | (2006.01) |
| *B60W 30/10* | (2006.01) |
| *B60W 30/12* | (2006.01) |
| *G06K 9/00* | (2006.01) |
| *G08G 1/16* | (2006.01) |

(52) U.S. Cl.
CPC ........... *G05D 1/0246* (2013.01); *B60W 10/20* (2013.01); *B60W 30/10* (2013.01); *B60W 30/12* (2013.01); *G05D 1/0231* (2013.01); *G06K 9/00798* (2013.01); *G08G 1/167* (2013.01); *B60R 2300/804* (2013.01); *B60W 2420/403* (2013.01); *B60W 2420/42* (2013.01); *B60W 2710/20* (2013.01); *B60Y 2200/10* (2013.01); *B60Y 2300/12* (2013.01); *G05D 2201/0213* (2013.01)

(58) Field of Classification Search
None
See application file for complete search history.

(56) References Cited

U.S. PATENT DOCUMENTS

| 8,996,197 B2 | 3/2015 | Joh et al. |
| 9,552,523 B2 * | 1/2017 | You .................... G06K 9/00798 |
| (Continued) | | |

FOREIGN PATENT DOCUMENTS

EP 2 333 484 A1 6/2011

*Primary Examiner* — Kevin P Mahne
(74) *Attorney, Agent, or Firm* — Lawrence D. Hazelton

(57) ABSTRACT

A lane-keeping system suitable for use on an automated vehicle includes a camera, an inertial-measurement-unit, and a controller. The camera is configured to detect a lane-marking of a roadway traveled by a vehicle. The inertial-measurement-unit is configured to determine relative-motion of the vehicle. The controller in communication with the camera and the inertial-measurement-unit. When the lane-marking is detected the controller is configured to steer the vehicle towards a centerline of the roadway based on a last-position, and determine an offset-vector indicative of motion of the vehicle relative to the centerline of the roadway. When the lane-marking is not detected the controller is configured to: determine an offset-position relative to the last-position based on information from the inertial-measurement-unit, determine a correction-vector used to steer the vehicle from the offset-position towards the centerline of the roadway based on the last-position and the offset-vector, and steer the vehicle according to the correction-vector.

7 Claims, 6 Drawing Sheets

(56) References Cited

U.S. PATENT DOCUMENTS

| | | | | |
|---|---|---|---|---|
| 2009/0299573 | A1* | 12/2009 | Thrun | B62D 15/025 |
| | | | | 701/41 |
| 2013/0116854 | A1* | 5/2013 | Moshchuk | B60W 30/12 |
| | | | | 701/1 |
| 2014/0152829 | A1* | 6/2014 | Suzuki | G08G 1/167 |
| | | | | 348/148 |
| 2015/0145664 | A1* | 5/2015 | You | G06K 9/00798 |
| | | | | 340/438 |
| 2015/0149036 | A1* | 5/2015 | You | B60W 30/12 |
| | | | | 701/41 |
| 2015/0307095 | A1* | 10/2015 | Aso | B60W 30/12 |
| | | | | 701/1 |
| 2016/0327947 | A1* | 11/2016 | Ishikawa | B60W 50/08 |

* cited by examiner

LANE-KEEPING SYSTEM FOR AUTOMATED VEHICLES

TECHNICAL FIELD OF INVENTION

This disclosure generally relates to a lane-keeping system for an automated vehicle, and more particularly relates to using historical vehicle motion information to operate an automated vehicle when a lane-marking is not detected by a camera.

BACKGROUND OF INVENTION

It is known to operate, e.g. steer, an automated vehicle using a camera to detect features of a roadway such as lane-markings and curbs. However, in some instances those features may be inconsistent, degraded, or otherwise undetectable. In the absence of lane-markings, many systems simply disengage and give control back to the vehicle operator, even though lane-markings may be only momentarily undetected by the camera.

SUMMARY OF THE INVENTION

In accordance with one embodiment, a lane-keeping system suitable for use on an automated vehicle is provided. The system includes a camera, an inertial-measurement-unit, and a controller. The camera is configured to detect a lane-marking of a roadway traveled by a vehicle. The inertial-measurement-unit is configured to determine relative-motion of the vehicle. The controller in communication with the camera and the inertial-measurement-unit. When the lane-marking is detected the controller is configured to: determine a last-position of the vehicle relative to the centerline of the roadway based on a the lane-marking, determine a current-vector used to steer the vehicle towards a centerline of the roadway based on the last-position, and determine an offset-vector indicative of motion of the vehicle relative to the centerline of the roadway. When the lane-marking is not detected the controller is configured to: determine an offset-position relative to the last-position based on information from the inertial-measurement-unit, determine a correction-vector used to steer the vehicle from the offset-position towards the centerline of the roadway based on the last-position and the offset-vector, and steer the vehicle according to the correction-vector.

In another embodiment, a method for controlling an automated vehicle is provided. The method includes the step of receiving a video-signal from a camera. The method also includes the step of receiving a position-signal from an inertial-measurement-unit. The method also includes the step of detecting, by a controller, a lane-marking based on the video-signal. The method also includes the step of determining a last-position relative to a centerline of a roadway, based on the lane-marking. The method also includes the step of determining a current-vector based on the centerline of a roadway. The method also includes the step of determining an offset-vector, indicative of motion of the vehicle relative to the centerline, based on the position-signal. The method also includes the step of steering the vehicle according to the current-vector in an automated-mode when the lane marking is detected. The method also includes the step of determining an offset-position, relative to the last-position, based on the position-signal. The method also includes the step of determining a correction-vector, used to steer the vehicle from the offset-position towards the centerline of the roadway, based on the last-position and the offset-vector. The method also includes the step of steering the vehicle according to the correction-vector in an automated-mode when the lane-marking is not detected. The method also includes the step of steering the vehicle in a manual-mode, when the lane-marking is not detected, and after a time-threshold is achieved.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
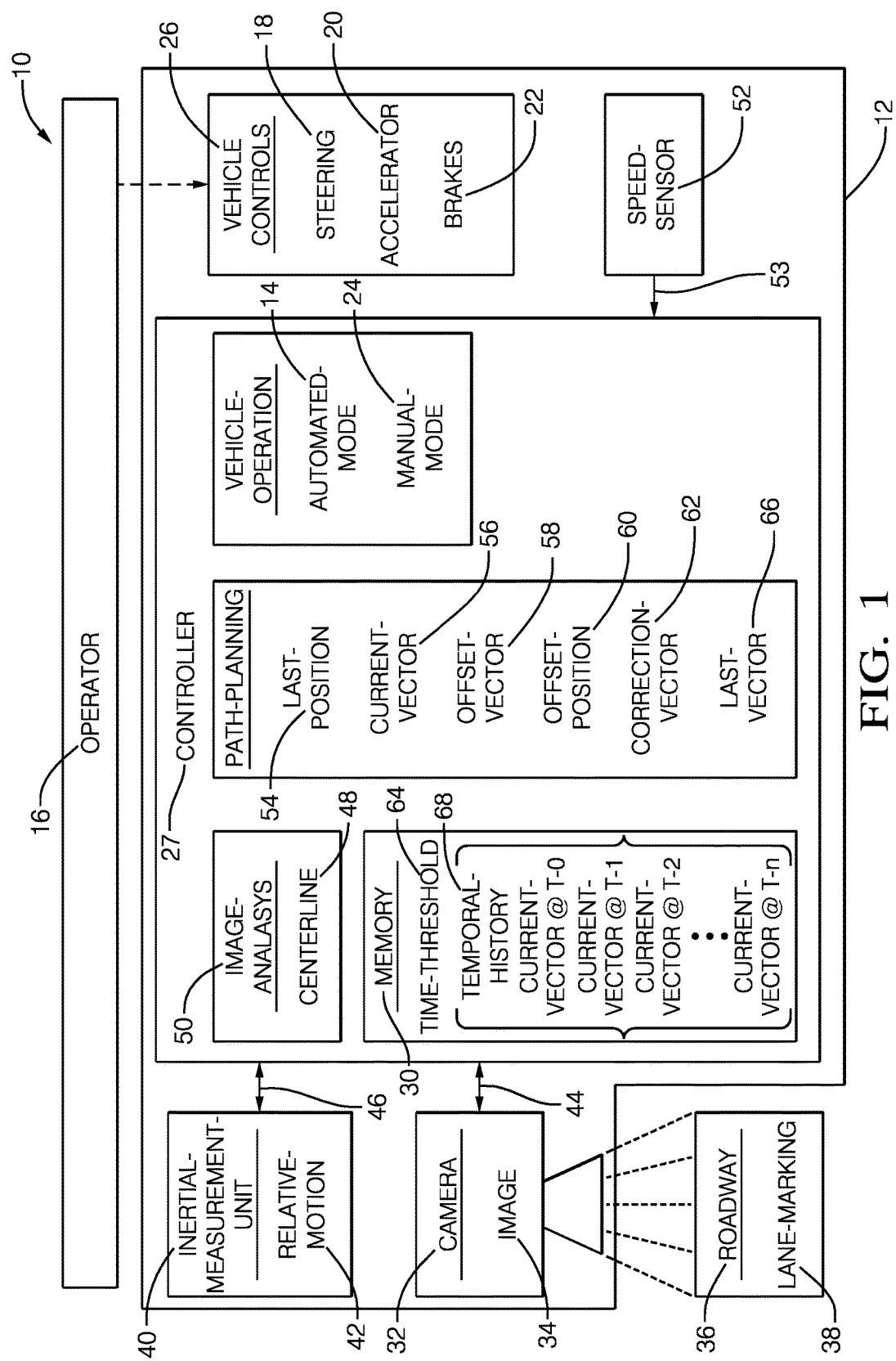
FIG. 1 is a diagram of a lane-keeping system in accordance with one embodiment.

FIG. 1 illustrates a non-limiting example of a lane-keeping system 10, hereafter referred to as the system 10, suitable for use on an automated vehicle, hereafter referred to as the vehicle 12. In general, the system 10 is configured to operate (i.e. drive) the vehicle 12 in an automated-mode 14 whereby an operator 16 of the vehicle 12 is little more than a passenger. That is, the operator 16 is not substantively involved with the steering 18 or operation of the accelerator 20 and brakes 22 of the vehicle 12. It is contemplated that the vehicle 12 may also be operated in a manual-mode 24 where the operator 16 is fully responsible for operating the vehicle-controls 26, or in a partial-mode (not shown) where control of the vehicle is shared by the operator 16 and a controller 28 of the system 10.

The controller 28 may include a processor (not specifically shown) such as a microprocessor or other control circuitry such as analog and/or digital control circuitry including an application specific integrated circuit (ASIC) for processing data as should be evident to those in the art. The controller 28 may include a memory 30, including non-volatile memory, such as electrically erasable programmable read-only memory (EEPROM) for storing one or more routines, thresholds, and captured data. The one or more routines may be executed by the processor to perform steps for operating the vehicle 12 based on signals received by the controller 28 as described herein.

The system 10 includes a camera 32 used to capture an image 34 of a roadway 36 traveled by the vehicle 12. Examples of the camera 32 suitable for use on the vehicle 12 are commercially available as will be recognized by those in the art, one such being the APTINA MT9V023 from Micron Technology, Inc. of Boise, Id., USA. The camera 32 may be mounted on the front of the vehicle 12, or mounted in the interior of the vehicle 12 at a location suitable for the camera 32 to view the area around the vehicle 12 through the windshield of the vehicle 12. The camera 32 is preferably a video type camera or camera that can capture images of the roadway 36 and surrounding area at a sufficient frame-rate, of ten frames per second, for example.

The image 34 may include, but is not limited to, a lane-marking 38 on the left side and right side of a travel-lane of the roadway 36. The lane-marking 38 may include a solid-line, as is typically used to indicate the boundary of a travel-lane of the roadway 36. The lane-marking 38 may also include a dashed-line, as is also typically used to indicate the boundary of a travel-lane of the roadway 36. The lane-marking 38 may become non-existent or otherwise undetectable by the camera 32 for a number of reasons such as, but not limited to, fading of the lane-marking-paint, erosion of the road surface, snow or dirt on the roadway 36, precipitation or dirt on the lens of the camera 32, operational failure of the camera 32, etc.

The system 10 also includes an inertial-measurement-unit 40, hereafter referred to as the IMU 40, used to determine a relative-motion 42 of the vehicle 12. The relative-motion 42 measured by the IMU 40 may include the vehicle's 12 current yaw rate, longitudinal acceleration, lateral acceleration, pitch rate, and roll rate. One example of the several instances of the IMU 40 suitable for use on the vehicle 12 that are commercially available as will be recognized by those in the art, is the 6DF-1N6-C2-HWL from Honeywell Sensing and Control, Golden Valley, Minn., USA.

The system 10 may also include a speed-sensor 52 used to determine a speed of the vehicle 12. The speed-sensor 52 may include a wheel-speed-sensor typically found on automotive applications. Other sensors capable of determining the speed of the vehicle 12 may include, but are not limited to, a global positioning system (GPS) receiver, and a RADAR transceiver, and other devices as will be recognized by those skilled in the art.

The controller is in electrical communication with the camera 32 and the IMU 40 so that the controller 28 can receive the image 34, via a video-signal 44, and the relative-motion 42 of the vehicle 12, via a position-signal 46. The position-signal 46 originates in the IMU 40 and may include the vehicle's 12 current yaw rate, longitudinal acceleration, lateral acceleration, pitch rate, and roll rate, which defines the relative-motion 42 of the vehicle 12, e.g. lateral-motion, longitudinal-motion, change in yaw-angle, etc. of the vehicle 12. The controller 28 is also in electrical communication with the speed-sensor 52 so that the controller 28 can receive an speed of the vehicle 12 via a speed-signal 53.

The controller 28 is generally configured (e.g. programmed or hardwired) to determine a centerline 48 on the roadway 36 for the vehicle 12 based on the lane-marking 38 of the roadway 36 detected by the camera 32. That is, the image 34 detected or captured by the camera 32 is processed by the controller 28 using known techniques for image-analysis 50 to determine where along the roadway 36 the vehicle should be operated or be steered. Vision processing technologies, such as the EYE Q® platform from Moblieye Vision Technologies, Ltd. of Jerusalem, Israel, or other suitable devices may be used. By way of example and not limitation, the centerline 48 is preferably in the middle of the travel-lane defined by the lane-marking 38 of the roadway 36.

Figure 2A:
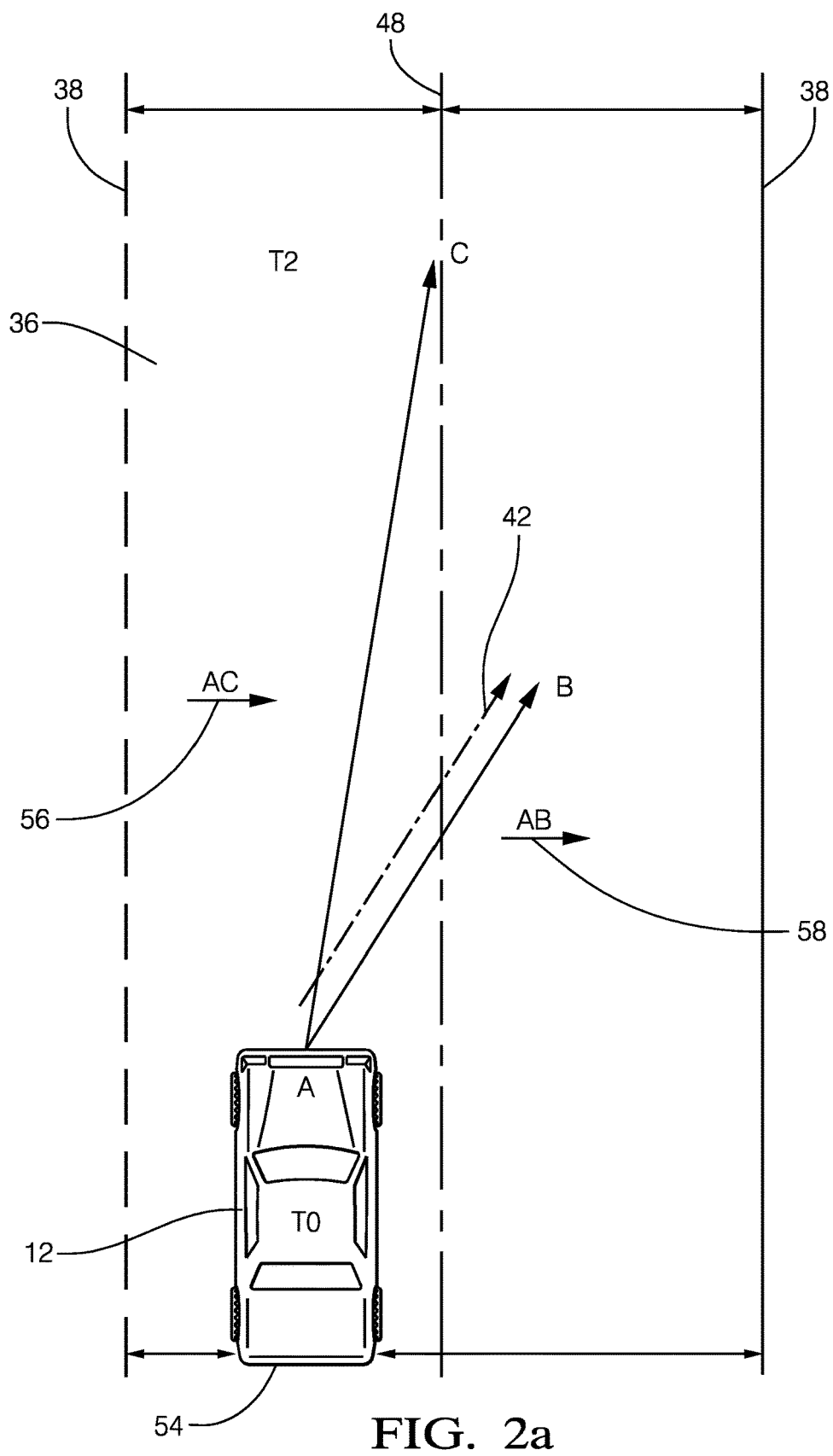
FIGS. 2a and 2b are illustrations of motion on a roadway of a vehicle equipped with the system of FIG. 1 in accordance with one embodiment.

FIG. 2a illustrates a non-limiting example of when the controller 28 is steering the vehicle 12 in the automated-mode 14 from point A at time T0 towards a desired point C located at the centerline 48 of the roadway 36. The controller 28 is using the lane-marking 38 as detected by the camera 32 to determine the centerline 48. Point C is located at a predetermined line-of-sight distance in front of the vehicle 12, as will be recognized by one skilled on the art of automated vehicle controls, and represents the desired position of the vehicle 12 at time T2, which is understood to be in the future relative to time T0. The controller 28 is further configured to determine a last-position 54 relative to the centerline 48 of the roadway 36 based on the lane-marking 38. The last-position 54 may be updated by the controller 28 based on a predetermined rate, between one millisecond (1 ms) and 100 ms for example, to account for changes in the curvature of the roadway 36 as the vehicle travels along the roadway 36. The update rate may be varied based on the speed of the vehicle 12. When the lane-marking 38 is detected by the camera 32, the last-position 54 and point A coincide or are coincident. By way of example and not limitation, the last-position 54 is shown to be located to the left of the centerline 48 of the roadway 36 at time T0 in FIG. 2. The controller 28 is further configured to determine a current-vector 56, represented by the arrow labeled AC, which illustrates the speed and direction of the vehicle 12 being steered by the controller 28 from point A to the desired point C. The controller is further configured to determine an offset-vector 58 that indicates the actual motion of the vehicle 12 relative to the centerline 48 and/or the lane-marking 38 of the roadway 36, regardless of the desired value of the current-vector 56. The offset-vector 58 is represented by the arrow labeled AB, which illustrates the actual speed and actual direction of the vehicle 12 traveling from point A to point B. The offset-vector 58 may differ from the current-vector 56 due to crowning of the roadway 36, wind gusts, standing water, and other phenomena. Input from the IMU 40, the camera 32, and the speed-sensor 52 is used by the controller 28 to determine the offset-vector 58, as will be recognized by one skilled in the art.

Figure 2B:
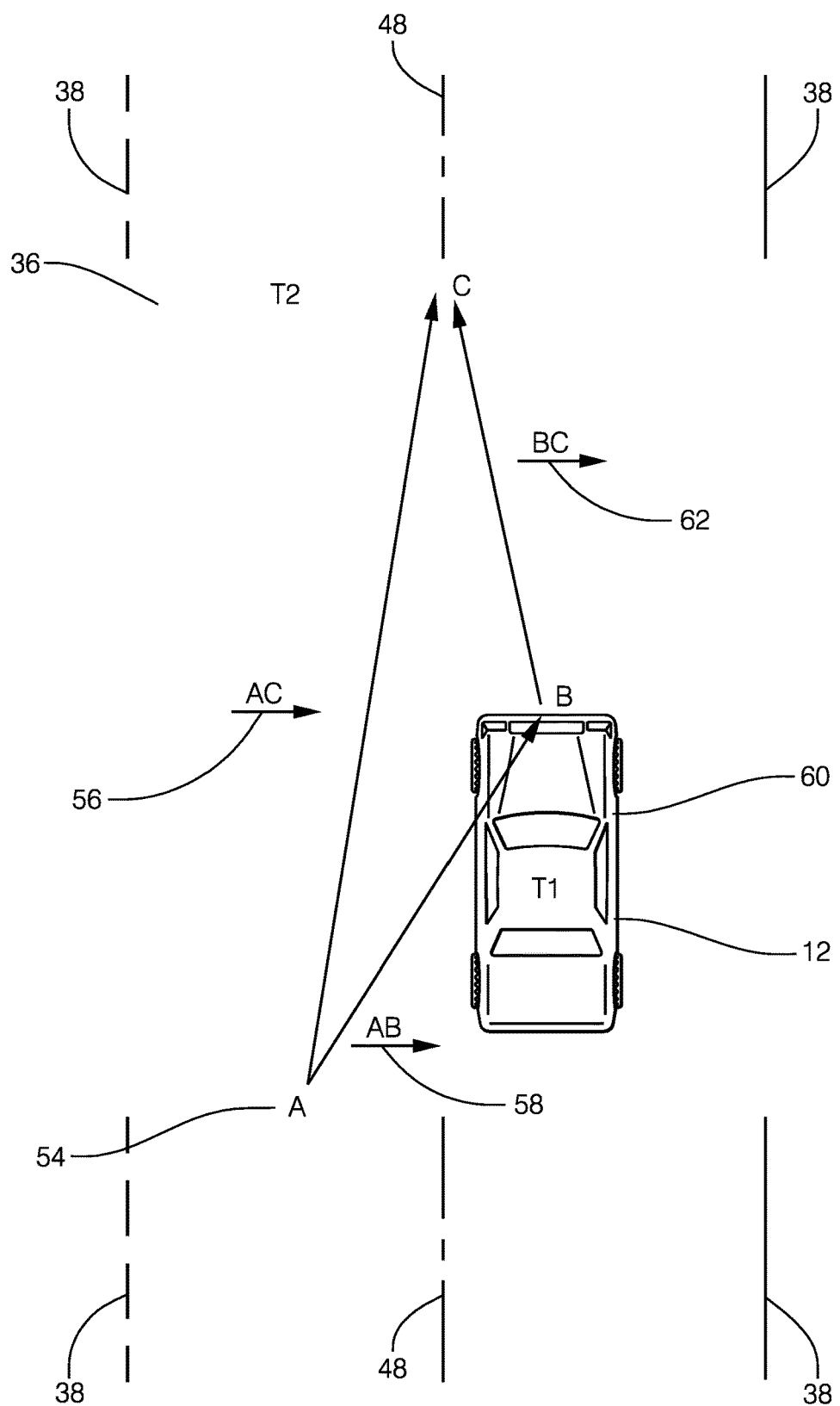

FIG. 2b shows a non-limiting example for when the lane-marking 38 is not detected by the camera 32, as illustrated in the figure by the discontinuity or termination of the lane-marking 38 after point A. The discontinuity of the lane-marking 38 may occur on either side, or both sides, of the roadway 36. At time T1, the vehicle 12 has moved from the last-position 54 to point B and the controller has determined the offset-vector 58 as described previously. The controller 28 is further configured to determine an offset-position 60 relative to the last-position 54, and based on the relative-motion 42 information received from the IMU 40 and based on the speed of the vehicle 12 received from the speed-sensor 52. The offset-position 60 is defined as the position attained by the vehicle 12 that is off the desired path of travel, or in other words, how far the vehicle 12 is off-course from the current-vector 56. The controller 28 is further configured to determine a correction-vector 62, illustrated by the arrow BC, used to steer the vehicle 12 from the offset-position 60 to the desired point C. The correction-vector 62 is defined as the vehicle's 12 direction and vehicle's 12 speed needed to steer the vehicle 12 back to the desired point C, as previously determined by the controller 28. The correction-vector 62 is based on the last-position 54 and the offset-vector 58, and is determined using the known method of vector algebra, where the correction-vector 62 is equal to the difference between the current-vector 56 and the offset-vector 58. The controller 28 then steers the vehicle 12 according to the correction-vector 62 until either the lane-marking 38 is detected by the camera 32, or until a time-threshold 64 (FIG. 1) has been reached where the vehicle-operation is returned to manual-mode 24. The time-threshold 64 may vary according to the speed of the vehicle 12.

Figure 3A:
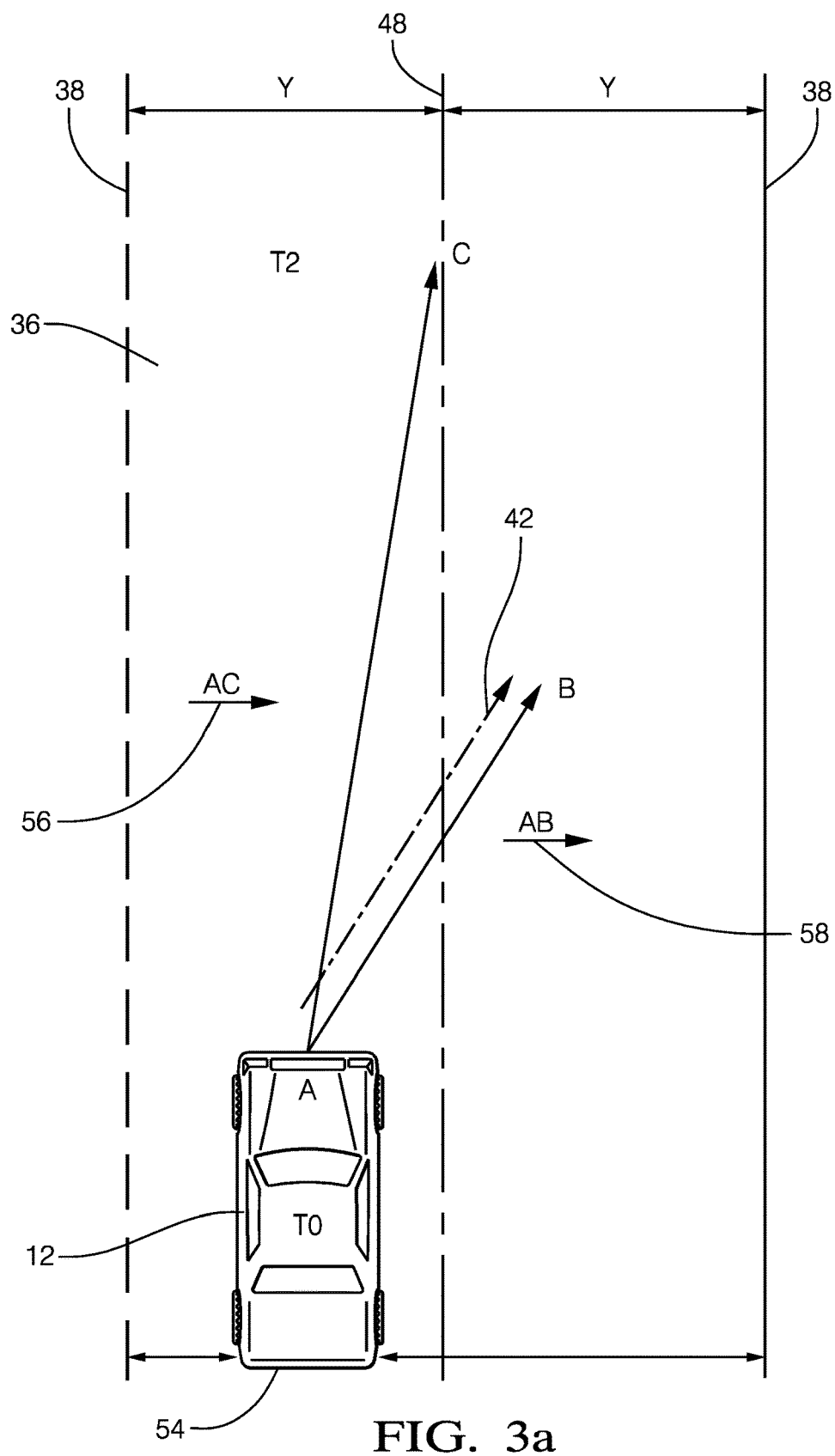
FIGS. 3a and 3b are illustrations of motion on a roadway of a vehicle equipped with the system of FIG. 1 in accordance with one embodiment.
Figure 3B:
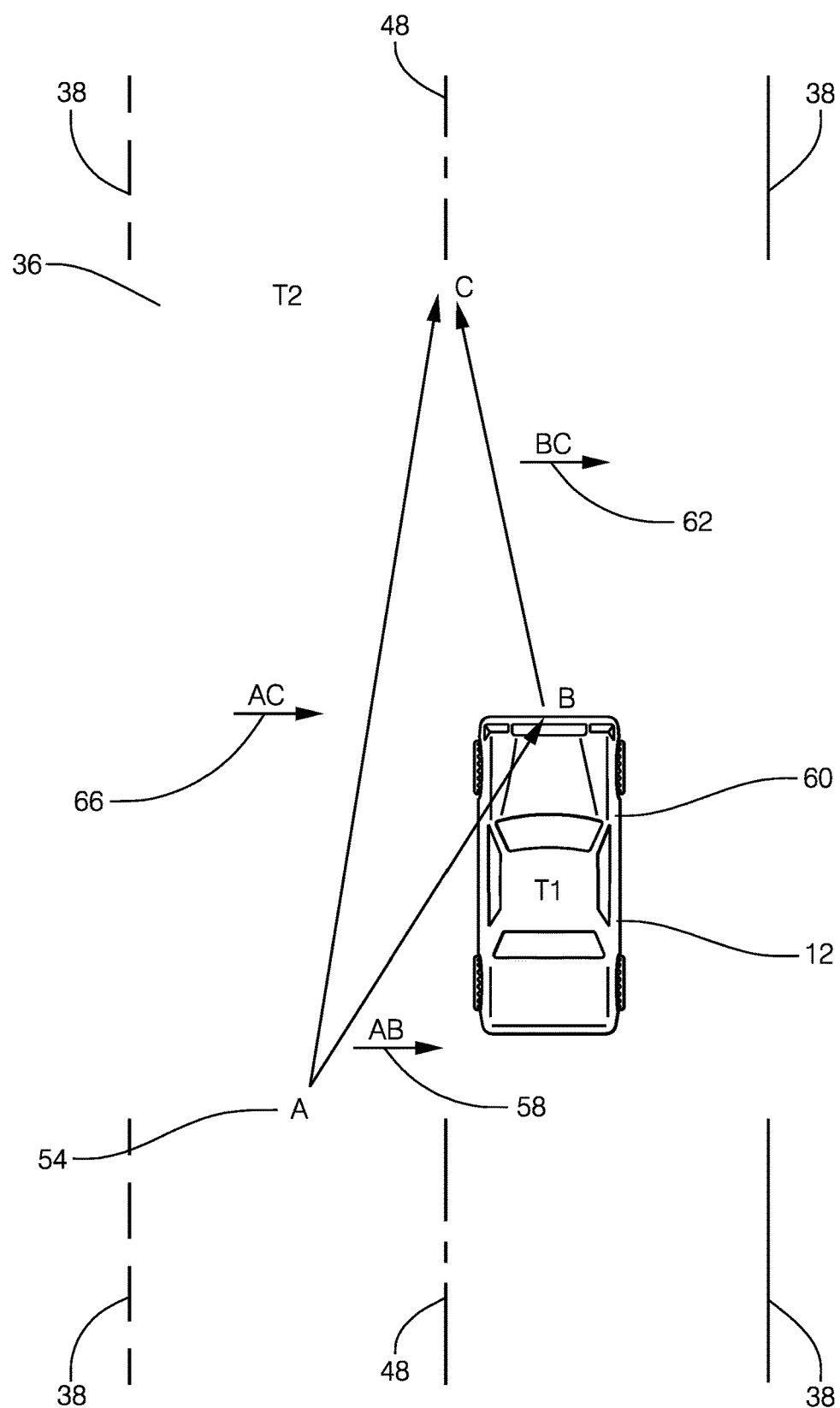

FIG. 3b shows another embodiment where the controller is further configured to determine a last-vector 66, which is based on a temporal-history 68 (FIG. 1) of the current-vector 56. The temporal-history 68 is defined as a series of data going back in time from the current data point. The last-vector 66 is stored in the memory 30 of the controller 28, thereby generating a data-buffer of the previous current-vector 56 data points. The last-vector 66 may be updated at a rate of between 1 ms and 100 ms. A predetermined number of the data points in the temporal-history 68 may be used to determine the last-vector 66 by known methods of data processing such as a running-average, an average of the ten most recent data points, an infinite-filter, and other methods known to one skilled in the art of data processing. The controller 28 is further configured to determine a correction-vector 62, illustrated by the arrow BC, based on the last-vector 66 and steer the vehicle 12 according to the correction-vector 62 until either the lane-marking 38 is detected by the camera 32, or until a time-threshold 64 has been reached where the vehicle-operation is returned to manual-mode 24. The correction-vector 62 is defined as the vehicle's 12 direction and vehicle's 12 speed needed to steer the vehicle 12 back to the desired point C, as previously determined by the controller 28.

Figure 4:
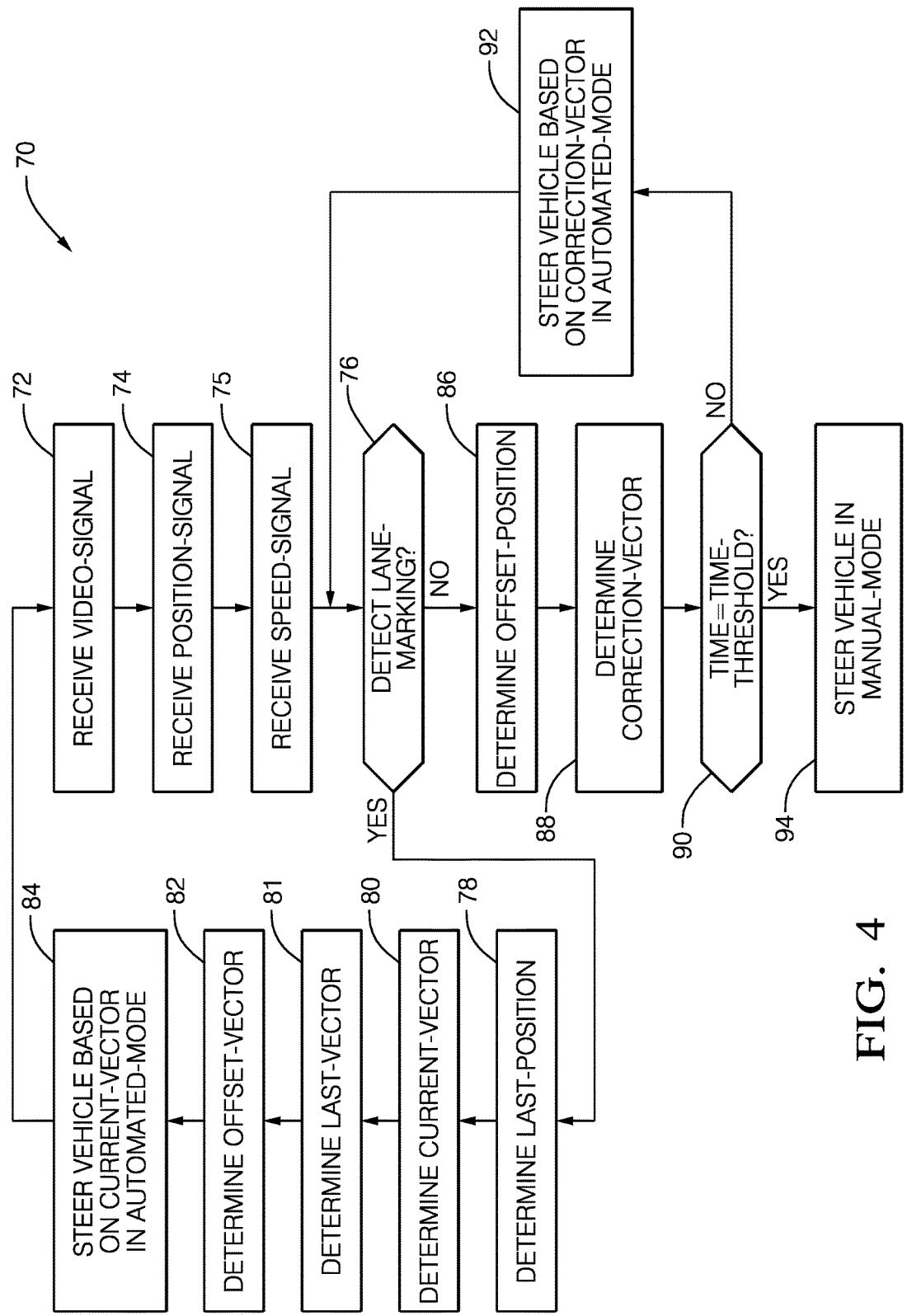
FIG. 4 is a flowchart of a method of operating the system of FIG. 1 in accordance with one embodiment.

FIG. 4 illustrates a non-limiting example of a method 70 for controlling the vehicle 12. In particular, the method 70 is used in conjunction with the system 10 to steer a vehicle 12 in the automated-mode 14 and by the operator 16 in the manual-mode 24.

Step 72, RECEIVE VIDEO-SIGNAL, may include receiving an image of a lane-marking 38 from a camera 32 suitable for use on the vehicle 12. The image 34 may include, but is not limited to, a lane-marking 38 on the left side and right side of a travel-lane of the roadway 36. The lane-marking 38 may include a solid-line, as is typically used to indicate the boundary of a travel-lane of the roadway 36. The lane-marking 38 may also include a dashed-line, as is also typically used to indicate the boundary of a travel-lane of the roadway 36. The lane-marking 38 may become non-existent or otherwise undetectable by the camera 32 for a number of reasons such as, but not limited to, fading of the lane-marking-paint, erosion of the road surface, snow or dirt on the roadway 36, precipitation or dirt on the lens of the camera 32, operational failure of the camera 32, etc. Examples of the camera 32 suitable for use on the vehicle 12 are commercially available as will be recognized by those skilled in the art, such as the APTINA MT9V023 from Micron Technology, Inc. of Boise, Id., USA. The camera 32 may be mounted on the front of the vehicle 12, or mounted in the interior of the vehicle 12 at a location suitable for the camera 32 to view the area around the vehicle 12 through the windshield of the vehicle 12. The camera 32 is preferably a video type camera or camera that can capture images of the roadway 36 and surrounding area at a sufficient frame-rate, of ten frames per second, for example.

Step 74, RECEIVE POSITION-SIGNAL, may include a signal from an inertial-measurement-unit (IMU) 40 used to determine the relative-motion 42 of the vehicle 12. The relative-motion 42 measured by the IMU 40 may include the vehicle's 12 current yaw rate, longitudinal and lateral acceleration, and pitch and roll rates. One example of the several instances of the IMU 40 suitable for use on the vehicle 12 that are commercially available as will be recognized by those in the art, is the 6DF-1N6-C2-HWL from Honeywell Sensing and Control, Golden Valley, Minn., USA.

Step 75, RECEIVE SPEED-SIGNAL, may include a signal from a speed-sensor 52 used to determine the speed of the vehicle 12. The speed-sensor 52 may include a wheel-speed-sensor typically found on automotive applications. Other devices capable of determining the speed of the vehicle 12 may include, but are not limited to, a global positioning system (GPS) receiver, and a RADAR transmitter and receiver, and other devices as will be recognized by those skilled in the art.

Step 76, DETECT LANE-MARKING, which may include detecting a lane-marking 38 of the roadway 36, by the controller 28, as captured by the camera 32. The controller 28 is configured (e.g. programmed or hardwired) to determine the centerline 48 on the roadway 36 for the vehicle 12 based on the lane-marking 38 of the roadway 36 detected by the camera 32. That is, the image 34 detected or captured by the camera 32 is processed by the controller 28 using known techniques for image-analysis 50 to determine where along the roadway 36 the vehicle should be operated or be steered. Vision processing technologies, such as the EYE Q® platform from Moblieye Vision Technologies, Ltd. of Jerusalem, Israel, or other suitable devices may be used. Typically, the centerline 48 is preferably in the middle of the lane-marking 38 of the roadway 36.

Step 78, DETERMINE LAST-POSITION, may include determining a last-position 54 relative to the centerline 48 of a roadway 36 based on the lane-marking 38. The last-position 54 may be updated by the controller 28 based on a predetermined rate between one millisecond (1 ms) and 100 ms to account for changes in the curvature of the roadway 36 as the vehicle travels along the roadway 36. The update rate may be varied based on the speed of the vehicle 12.

Step 80, DETERMINE CURRENT-VECTOR, may include determining a current-vector 56 which indicates the speed and direction of the vehicle 12 being steered by the controller 28 from point A to the desired point C (FIG. 2).

Step 81, DETERMINE LAST-VECTOR, which may include determining a last-vector based on the temporal-history 68 of the current-vector 56 stored in the memory 30 of the controller 28 thereby generating a data-buffer of the previous current-vector 56 data points. The last-vector 66 may be updated at a rate of between 1 ms and 100 ms. A predetermined number of the data points in the temporal-history 68 may be used to determine the last-vector 66 by known methods of data processing such as a running-average, an average of the ten most recent data points, an infinite-filter, and other methods known to one skilled in the art of data processing.

Step 82, DETERMINE OFFSET-VECTOR, which may include determining an offset-vector 58 that indicates the actual motion of the vehicle 12 relative to the centerline 48 of the roadway 36, regardless of the desired value of the current-vector 56. The offset-vector 58 indicates the actual speed and actual direction of the vehicle 12 traveling from point A to point B (FIG. 2). The offset-vector 58 may differ from the current-vector 56 due to crowning of the roadway 36, wind gusts, standing water, and other phenomena. Input from the IMU 40, the camera 32, and the speed-sensor 52 is used by the controller 28 to determine the offset-vector 58, as will be recognized by one skilled in the art.

Step 84, STEER VEHICLE BASED ON CURRENT-VECTOR IN AUTOMATED-MODE, may include steering the vehicle 12 in automated-mode 14 from point A at to a desired point C at the centerline 48 of the roadway 36, using the lane-marking 38 as detected by the camera 32.

Step 86, DETERMINE OFFSET-POSITION, may include determining an offset-position 60 relative to the last-position 54 and based on the relative-motion 42 information received from the IMU 40 and the speed-sensor 52 when the lane-marking 38 is not detected by the camera 32.

Step 88, DETERMINE CORRECTION-VECTOR, which may include determining a correction-vector 62, illustrated by the arrow BC (FIG. 2b), used to steer the vehicle 12 from the offset-position 60 to the desired point C at the centerline 48 of the roadway 36. The correction-vector 62 is based on the last-position 54 and the offset-vector 58, and is determined using the known method of vector algebra, where the correction-vector 62 is equal to the difference between the current-vector 56 and the offset-vector 58. Alternatively, the correction-vector 62 may be based on the last-vector 66 and the offset-vector 58.

Step 90, DETERMINE IF TIME-THRESHOLD IS ACHIEVED, which may include determining if a time-threshold 64 is equal to a predefined time. The time-threshold 64 may vary according to the speed of the vehicle 12.

Step 92, STEER VEHICLE BASED ON CORRECTION-VECTOR IN AUTOMATED-MODE, which may include steering the vehicle based on the correction-vector 62 in the automated-mode 14 when the time-threshold 64 has not been achieved.

Step 94, STEER VEHICLE IN MANUAL-MODE, which may include steering the vehicle 12 in manual-mode 24 by the operator 16 when the time-threshold 64 has been achieved.

Accordingly, a lane-keeping system (the system 10), a controller 28 for the system 10 and a method 70 of controlling a vehicle 12 is provided. In contrast to prior systems, the system 10 described herein delays the disengagement of automated driving controls when lane-markings 38 are non-existent, or otherwise undetectable by the camera 32. The disengagement of automated driving controls, even though the lane-markings are momentarily undetectable, can lead to significant customer dissatisfaction and annoyance.

While this invention has been described in terms of the preferred embodiments thereof, it is not intended to be so limited, but rather only to the extent set forth in the claims that follow.

We claim:

1. A lane-keeping system suitable for use on a vehicle, said system comprising:
    a camera configured to detect a lane-marking of a roadway travel-lane traveled by the vehicle;
    an inertial-measurement-unit configured to determine relative-motion of the vehicle; and
    a controller in communication with the camera and the inertial-measurement-unit, wherein when the lane-marking is detected by the camera, said controller is configured to determine a centerline within the roadway travel-lane defined by the lane-marking,
    determine a last-position of the vehicle relative to the centerline of the roadway travel-lane based on the lane-marking detected by the camera,
    determine a current-vector used to steer the vehicle towards the centerline of the roadway travel-lane based on the last-position, and
    determine an offset-vector indicative of motion of the vehicle relative to the centerline of the roadway travel-lane, and wherein
    when the lane-marking is not detected by the camera said controller is configured to
    determine an offset-position of the vehicle relative to the last-position of the vehicle based on information from the inertial-measurement-unit,
    determine a correction-vector used to steer the vehicle from the offset-position towards the centerline of the roadway travel-lane based on the last-position and the offset-vector, and steer the vehicle according to the correction-vector.

2. The system in accordance with claim 1, wherein the controller is further configured to determine a last-vector based on a temporal-history of the current-vector, and the correction-vector is further based on the last-vector.

3. The system in accordance with claim 1, wherein the system includes a speed-sensor configured to measure speed of the vehicle, and the offset-position is also determined based on the measured speed.

4. A method for controlling a vehicle, said method comprising:
    receiving a video-signal from a camera;
    receiving a vehicle position-signal from an inertial-measurement-unit;
    detecting, by a controller, a lane-marking of a roadway travel-lane based on the video-signal;
    determining, by the controller, a centerline within the roadway travel-lane defined by the lane-marking;
    determining a last-position of the vehicle relative to the centerline of the roadway travel-lane based on the lane-marking;
    determining a current-vector based on the centerline of the roadway travel-lane;
    determining an offset-vector indicative of motion of the vehicle relative to the centerline based on the position-signal;
    steering the vehicle according to the current-vector in an automated-mode when the lane marking is detected by the controller;
    determining, with the controller, whether the lane-marking is detected:
        when the lane-marking is not detected by the controller for a time less than a time-threshold;
    determining an offset-position relative to the last-position based on the position-signal;
    determining a correction-vector used to steer the vehicle from the offset-position towards the centerline of the roadway travel-lane based on the last-position and the offset-vector;
    steering the vehicle according to the correction-vector in an automated-mode;
        when the lane-marking is not detected by the controller for a time equal to or greater than a time-threshold,
    steering the vehicle in a manual-mode.

5. The method in accordance with claim 4, wherein the method includes the step of receiving a speed-signal from a vehicle speed-sensor, and the step of determining the offset-vector is further based on a speed of the vehicle.

6. The method in accordance with claim 4, wherein the method includes determining a last-vector based on a temporal-history of the current-vector, and the correction-vector is further based on the last-vector.

7. The method in accordance with claim 6, wherein the last-vector is a running-average of the last-vector data points stored in a memory of the controller.

* * * * *